United States Patent

[11] 3,588,496

| [72] | Inventor | Lawrence R. Snowman |
| | | Pennellville, N.Y. |
| [21] | Appl. No | 786,996 |
| [22] | Filed | Dec. 26, 1968 |
| [45] | Patented | June 28, 1971 |
| [73] | Assignee | General Electric Company |

[54] RADIATION ANALYSIS APPARATUS HAVING AN ABSORPTION CHAMBER WITH PARTIALLY REFLECTIVE MIRROR SURFACES
8 Claims, 1 Drawing Fig.

[52] U.S. Cl. .................................... 250/43.5,
356/51, 356/205
[51] Int. Cl. .................................. G01n 21/26
[50] Field of Search ........................... 356/201,
205, 246, 97, 51; 250/43.5

[56] References Cited
UNITED STATES PATENTS
2,212,211  8/1940  Pfund ........................... 250/43.5
3,194,962  7/1965  Carlon et al. .................. 250/43.5

Primary Examiner—James W. Lawrence
Assistant Examiner—A. L. Birch
Attorneys—Richard V. Lang, Marvin A. Goldenberg, Frank L. Neuhauser, Oscar B. Waddell and Melvin M. Goldenberg ABSTRACT: A radiation absorption analysis apparatus is disclosed for identifying samples of gases, aerosols, and liquids which exhibit characteristic absorptances. The apparatus takes the form of an optical comparator with means for introducing into an absorption chamber in succession two adjacent parallel beams of dissimilar spectral content. At both extremities of the absorption chamber partially transmissive mirrors are arranged to sustain multiple internal reflections for the entrant radiation and thereby increase the absorptive path length. The beams exiting from the chamber are then measured in succession and compared for sample analysis.

The beam formation means, a partially reflective plane mirror at the entrant surface of the absorption chamber, and a partially reflective concave mirror at the exit surface of the absorption chamber, are coaxially arranged in a confocal system to minimize vignetting as well as to reduce sensitivity to stray dirt on the lens surfaces or to asymmetric zoning.

PATENTED JUN 28 1971  3,588,496
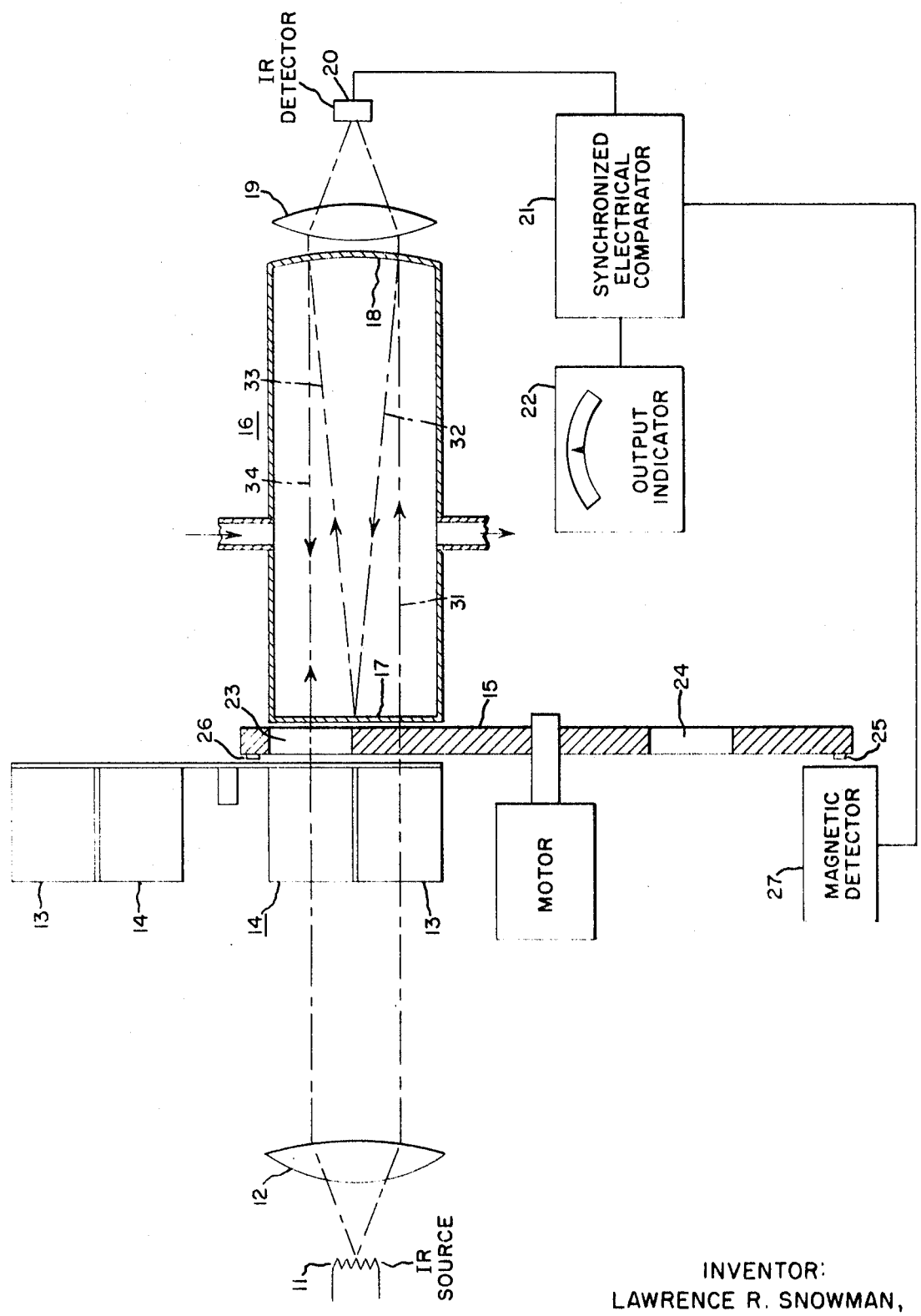
INVENTOR:
LAWRENCE R. SNOWMAN,
BY Richard V. Lang
HIS ATTORNEY.

RADIATION ANALYSIS APPARATUS HAVING AN ABSORPTION CHAMBER WITH PARTIALLY REFLECTIVE MIRROR SURFACES

BACKGROUND OF THE INVENTION

1. Field of the Invention

The invention relates to gas analysis apparatus employing radiation absorption phenomena and employs optical comparison techniques. The invention is applicable to both infrared absorption and visible light absorption and may be used in the measurement of a large number of common substances, such as alcohol vapor, water vapor, carbon dioxide, air pollution contaminants, toxic chemical vapors and generally materials in either gaseous, aerosol or liquid form.

2. Description of the Prior Art

In optical comparators, the absorption chamber has ordinarily been an item of substantial cost and complexity and it has been relatively difficult to provide a relatively long absorptive path length in devices having small dimensions. While devices employing absorption chambers with partially silvered mirrors have been proposed in the past, none seem to have been adapted for use in comparator systems where parallel adjacent beams pass through the absorption chamber and impinge on a single radiation detector. In one proposed single beam system, an extended path is provided between a pair of planar partially reflective mirrors in which the beam continuously diverges as the reflections are multiplied, thus producing substantial losses.

In other multiple mirror systems, either one or both mirrors are fully reflective and the path of the beam ordinarily progresses laterally across the mirror surfaces, thus requiring a considerable lateral dimension. To avoid beam divergence, successive focusing surfaces may be employed leading to a system that is both large and costly.

While the mirror system employing a single mirror pair has the advantage of being more compact and simpler in its reuse of the mirror elements, no system appears to have been proposed for treating adjacent parallel beams of differing spectral content in balanced fashion within the absorption chamber. To avoid the imbalance problem, one conventionally employs a single beam system, with rotating filters interposed between the initial source to alter the spectral content of the beam without displacing its path. This complicates the mechanical design of the filter since high rotational speeds are usually desirable.

SUMMARY OF THE INVENTION

Accordingly, it is an object of the present invention to provide an improved optical comparison apparatus for the detection and measurement of material in the form of gases, aerosols or liquids by the principle of selective absorption.

It is another object of the present invention to provide an optical comparison-type radiation absorption apparatus having an improved absorption chamber of multiple path length and compact dimensions.

It is still another object of the present invention to provide an optical comparison radiation absorption apparatus employing alternating adjacent parallel beams of differing spectral content having an absorption chamber whose optical elements are coaxial for repetitive use and which provide both substantial immunity to vignetting and self-balancing action for the two beams.

These and other objects of the invention may be achieved in accordance with the invention in a novel radiation absorption analysis apparatus comprising an absorption chamber; a single radiation source for producing two adjacent beams having dissimilar spectral properties directed into said absorption chamber and operating in succession; and a radiation detector coupled to the output of the absorption chamber. The absorption chamber is provided with a partially transmissive, partially reflective plane mirror at one end and a partially transmissive, partially reflective concave mirror at the other end. This arrangement provides for multiple reflections within the chamber of the entrant beams. In accordance with a further feature of the invention, the concave mirror is spaced at a distance equal to its focal length from the plane mirror to achieve confocal imaging and in accordance with another aspect of the invention the original beam is formed by means of a relay lens which projects an image of the source upon the concave mirror of a size substantially equal to the diameter of the mirror. To achieve additional advantage in reducing vignetting the relay lens is placed at a distance equal to the focal length of the concave mirror from the plane mirror so that the relay lens is also imaged on the concave mirror. The relay lens and mirrors are of the same aperture for this purpose. When the adjacent entrant beams have equal semicircular cross sections, the foregoing optical system provides means for successively transferring the beam from lower portions of the optical elements progressively to the upper portions of the elements and then the reverse. Since this function is provided symmetrically for both upper and lower beams, the optical properties of the path through the absorption chamber to the detector are made substantially identical and immune to dirt and other influences asymmetrically affecting the optical properties of these surfaces.

BRIEF DESCRIPTION OF THE DRAWING

The novel and distinctive features of the invention are set forth in the claims appended to the present application. The invention itself, however, together with the further objects and advantages thereof may best be understood by reference to the following description and the accompanying drawing.

DESCRIPTION OF THE PREFERRED EMBODIMENTS

Referring now to the drawing, a preferred embodiment of the invention is seen to comprise a source of radiation 11, a first relay lens 12, analytic and reference cells 13 and 14 respectively, a motor driven chopper wheel 15, an absorption chamber 16 having partially silvered mirrors 17 and 18 at either extremity, an output lens 19, a radiation detector 20, a synchronized electrical comparator 21, and an output indicator means 22. The elements 11, 12, 17, 18, 19 and 20 are preferably on a common axis. These elements generally perform the function of measuring the concentration of a given sample of radiation absorptive gaseous material introduced into the absorption chamber 16. Where a plurality of reference filters 14 are provided, they may also be used to identify a plurality of sample materials. The principle of detection is based upon the radiation absorptive properties of the sample, ordinarily in the infrared spectral region.

The system functions in the following manner. Infrared radiation is produced by the source 11 having a broad spectrum throughout the near and middle infrared region (1—3 microns). The source 11 is heated to near incandescence (900° C.) by means of an electrical source not shown. The radiation from the source 11 is formed into a beam by the relay lens 12 which focuses an image of the source on the inner surface of the partially silvered mirror 18 at the remote end of the gas absorption chamber 16. The mirrors 17 and 18 are preferably first surface mirrors, with their reflective surfaces on the interior of the chamber.

Before the radiation reaches the mirror 18, however, the beam from the lens 12 is divided into two parts pursuing two parallel paths. Part of the beam, generally from the lower half of tee lens 12, passes through the analytic cell 13, the lower half of the substrate and coating of the partially silvered mirror 17, and thence through the sample in the absorption chamber 16 to the remote partially silvered mirror 18. The other part of the beam, generally from the upper portion of the lens 12, passes through the reference cell 14, the upper half of the substrate and coating of the partially silvered mirror 17, and thence through the sample in the chamber 16 to the remote partially silvered mirror 18. As illustrated in FIG. 1, the motor driven chopper wheel 15 is in a position to interrupt the lower beam through the analytic cell 13 while a slot 23 in the wheel permits passage of the upper beam through the reference cell 14. The chopper wheel 15 is provided with diametrically opposed slots 23 and 24 so that rotation of the motor driven chopper wheel causes successive illuminations of the chamber 16 by radiation passing first through the analytic and then next through the reference cell. Because of the high reflectance of the mirror 17, however, only a small part of the total radiation impinging on it enters into the absorption chamber 16. This loss is usually unimportant since it can be made up by increasing the intensity of the source 11 and does not measurably increase the noise figure.

A part of the radiation initially impinging upon the partially silvered mirror 18 passes through the mirror substrate, through the output lens 19 and is concentrated on the detector 20.

Another portion of the radiation initially impinging on the mirror 18 is reflected back within the absorption chamber toward the partially silvered mirror 17. In accordance with the invention, the mirror 18 is curved concavely and is arranged at its focal distance from the mirror 17, which is plane. By this confocal disposition an image initially focused on the surface of 18, after a third impingement on the surface 18 is refocused on that surface (18) inverted and of the initial size (as will be subsequently explained in detail). By this technique the radiation passes back and forth through the absorption chamber 16 between the mirrors 17 and 18.

At each impingement upon the partially silvered surface 18 a small portion of the radiation escapes through the substrate of the mirror 18 and is concentrated by the output lens 19 upon the detector 20. By such multiple reflections, the chamber 16, which may have the relatively modest dimensions of a few inches, may exhibit an effective optical path length of several feet. When the chamber 16 is filled with a gas having absorptive properties, the effective absorptive path length is thus greatly increased as is the detection sensitivity of the apparatus.

After impingement of the radiation exiting from the absorption chamber 16 upon the radiation detector 20, an electrical signal indicative of the radiation intensity is developed and coupled to the synchronized electrical comparator 21. The comparator 21 is arranged to compare the radiation impinging on the detector 20 at successive intervals, as the motor driven chopper wheel passes the radiation successively through the analytic cell 13 and the reference cell 14. In order to synchronize the electrical comparator 21 with the chopper wheel position and to obtain one electrical signal for the upper beam and one electrical signal for the lower beam, a pair of magnets 25 and 26 are arranged on the perimeter of the chopper wheel 15 so as to pass within sensing range of a magnetic detector 27. Pulses produced in the magnetic detector 27 are then supplied to the comparator 21 to synchronize the two electrical input signals from the radiation detector 20 with the corresponding beam selection.

The synchronized comparator 21 may be of conventional form including a pair of input gates or a simple synchronized switch, a pair of signal storage elements and a comparison or difference circuit. The input switching is synchronized by the pulses 27 to segregate the signal corresponding to the upper beam into one storage element and that corresponding to the other beam into the other signal storage element. The difference circuit may then be directly coupled to these storage elements to provide a continuous comparison reading. The electrical output of the comparator 21 is provided to suitable visual indicator means 22, such as a galvanometer.

The motor driven chopper wheel 15 may take any of a number of well-known forms, with the slots 23, 24 thereof subtending either 90° or 180° depending upon the requirements of the detector 20. The maximum speed of rotation is ordinarily limited by the time constant of the detector 20. If the slots subtend only 90°, so as to permit each period of radiation to be followed by an equal period of darkness, a motor speed of 1,200 rpm's is compatible with the available infrared detectors.

When used to measure the amount of a known sample present in the absorption chamber 16, the reference cell 14 is provided with a sample of the same gas at a relatively high concentration. For sensitivity, the cell should also achieve a substantial amount of absorption at a selected characteristic wavelength. The analytic cell 13 is at the same time provided with a material which is highly transmissive to radiation not appreciably absorbed by the sample.

In normal practice, the system is optically balanced initially with the absorption chamber empty, such that radiation passing through the reference cell and the analytic cell provides a balanced or zero output indication on the indicator 22. In order to achieve this initial optical balance of the system, neutral filters are ordinarily provided in one or the other of the cells 13 or 14. In addition, electrical means may be used to zero the output meter 22. One can, of course, employ a number of different electrical comparison techniques.

When the sample has been introduced into the absorption chamber 16 the system then becomes unbalanced, since the radiation which the sample absorbs has been largely removed by the reference cell 14—and thus substantially unaffected-—while the radiation passing through the analytic cell 13 is appreciably absorbed and therefore substantially affected. The difference in radiation reaching the detector 20 through the two cells (13 and 14) is accordingly measured by the synchronized comparator 21 and the measurement indicated by the indication means 22.

When it is desired to make the equipment capable of identifying and measuring more than a single sample, a plurality of reference cells 14 may be provided arranged to be selectively rotated into operating position in the upper beam. In an embodiment, where the sample is known to be of several well-known materials, a separate reference cell for each sample would be provided. One may also form the cells 13 and 14 into paired units selectively rotated into position. Ordinarily where small concentrations of a gas are to be tested, one may use narrower bands of radiation, such as are provided by band pass filters.

While one may employ as a reference cell, a cell having an attenuation notch coincident with that expected in the sample, a number of known alternative optical comparison techniques may be employed. For instance, one may employ selective filtering in both cells 13 and 14 or selective properties in the first cell only and an all-pass property in the other. In addition, while the members 13 and 14 may take the form of cells containing an absorptive sample of the same chemical substance as the test sample, one may also use simple filters having like optical properties. One may use either natural filters or wave interference filters in such application.

The term "reference" has, accordingly, been used in the sense that the selective or rejective property of the cell is coincident with an attenuation notch of a sample under analysis. The term "analytic" has been used to designate a balancing optical filter element between the source and the detector. In the case of a system having a plurality of reference cells, a single analytic cell may be all that is required, provided of course that each reference cell is provided with adequate neutral elements to balance each element against the analytic cell. In the usual case, initial system balance is achieved with the absorption chamber 16 purged of absorptive material, but other adjustments may be useful.

The optical features of the novel partially silvered absorption chamber 16 are as follows. All radiation transmissive elements including the lenses 12 and 19, the walls of the cells 13 and 14, and the substrate of the partially silvered mirrors 17 and 18 must be substantially transparent to the portion of the radiation spectrum in use. Germanium elements are most satisfactory for use in the 2½ to 13 micron infrared region, and arsenic trisulfide in the 1—12 micron region. Quartz may be used in the visible and near-visible region down to 3½ microns in the infrared.

The silvering of both partial mirrors 17 and 18 normally lies within the range permitting small transmittance of between 2 percent (but may approach zero) and 15 percent and a large reflectance of between 97 percent (but may approach 100 percent) and 80 percent They need not be alike. and ordinarily with a strong source. a lower transmittance (and correspondingly higher reflectance) in the mirror 17 may be desirable Assuming no divergent losses, the effective path length of the cell is $$Lp = \frac{d(1 - R_1 R_2)}{(1 - R_1 R_2)}$$

where $Lp$ is the effective path length, $d$ is the distance between the reflective surfaces 12 and 18, $R_1$ is the reflectance of the partially silvered mirror 12, and $R_2$ is the reflectance of the partially silvered mirror 18.

In a typical case, the effective path length may lie between $9d$ and several hundred $d$.

Assuming a given "$d$", the distance between the lens 12 and the mirror surface 18 is $2d$, the radius of curvature of the mirror 18 "$2d$," and its distance back to the mirror surface 17 "$d$". This provides a confocal system with the image of the IR source 12 being focused on the surface of the curved mirror 18, and the image of the extended source 11 filling the mirror 18.

Considering now the course of radiation after passing through the cells 13, 14 and chopper 15; a major portion of the radiation is reflected back at the partially silvered mirror 17 and lost. A small portion, however, penetrates the reflective surface of 17 and proceeds through the sample in the absorption chamber 16 until it impinges upon the curved reflector 18.

Most of the radiation forming the image on the mirror 18 is reflected back to plane mirror 17, but a portion of the radiation is transmitted through 18 to be concentrated by the lens 19 on the radiation detector 20. For optical coupling efficiency, the source 11 is located near the lens 12 slightly beyond its focus, and the focal length should be relatively short (1 to 2 inches) typically providing a numerical aperture of about one-half. The position should be adjusted to provide a beam of illumination of approximately the diameter of the element 18 (i.e., the image of the extended source 11 should fill the curved mirror 18). Similarly, for optical coupling efficiency the radiation detector 20 should be located close to the output lens 19. A focal length of from 1 to 2 inches is suitable here also. The lens 19 should be in close proximity to the mirror 18 and of the same aperture.

After the initial impingement of radiation on 18, the light reflected back from the mirror 18 is returned toward the plane mirror 17 at which surface most of the light is reflected back toward the surface 18 again. (A little light again penetrates the substrate of the plane mirror 17 and is lost.) Upon this second impingement upon the surface 18, the lens 12, due to its placement at the distance "$d$" behind the plane mirror 12 is imaged upon the mirror surface 18. A selection of a diameter for 18 equal to the diameter of lens 12 thus reduces losses due to vignetting. After this second impingement upon the curved mirror 18, a third impingement occurs also involving a further reflection from the plane mirror 17. On this third impingement, the original image of the source 11 formed on the mirror surface 18 is now refocused again on the surface 18. The refocused image of source 11 is inverted with respect to its prior orientation and of the same size as initially. Since the system employs partially silvered mirrors of high reflectivity, this process of image inversion is repeated a relatively large number of times.

The upper and lower beam of differing spectral properties are provided by the cells 13 and 14 as previously described. The cells 13, 14 may each be semicircular and adjoined for maximum optical efficiency. Together they form an approximately circular aperture, preferably equal to or slightly greater in diameter than the lenses and mirrors of the system. The cells themselves should not restrict the available aperture of the system. A circular mask of the same diameter as the plane mirror 17 may be provided at the bases of the cells 13, 14 and in proximity to the wheel 15. The boundary between elements 13 and 14 should ordinarily fall on the optical axis of the system and thus form two equal area, equal light intensity adjacent beams.

When the light from the source 11 divided into two separate adjacent beams, the confocal reflection system transfers the lower beam by the paths illustrated in the drawing form the lower portion of the optical system to the upper portion and then back again. Assuming a low entrant beam pursuing a path 31 parallel to the axis of the system, its first reflection from the lower portion of curved mirror 18 returns it by path 32 to the center of the plane mirror 17. The next reflection returns it to the upper portion of the curved mirror 18 through path 33 and finally by a parallel path 34 of reflection to the upper half of the plane mirror 17. The beam then returns on itself through the paths 34 to 31 impinging again on the upper portion of the curved mirror 18, the enter portion of the plane mirror 17, the lower portion of the plane mirror 18, and finally to the lower portion of the plane mirror 17 from which position it repeats the reflection process within the absorption chamber over again.

The forgoing description of the path followed by the low beam 31 also applies in an inverted sense for the high beam passed through reference filter 14. A high beam, parallel to the axis impinges on upper mirror portions and passes down to the lower portions of the mirrors and then returns to the upper portions using the same paths 34 and 31 in reverse sequence.

In addition to the self-evident advantage of increasing the path length of the gas absorption chamber, the foregoing design provides very low beam divergence (vignetting). In practice, design losses due to this cause need rarely exceed 1 percent (even assuming an optical path length of 50 reflections). While the system loses some radiation on each reflection on the inner surface of the plane mirror 17, it still achieves a low noise figure, typically one quarter that of a system fully silvered plane mirrors of comparable path length and is appreciably simpler in execution.

The system offers substantial immunity to optical imbalance. Since it employs a common source of illumination for both the analytic reference beams, major source fluctuations are cancelled. In addition, since the separate analytic and reference beams are regularly inverted, and displaced between upper and lower mirror halves, each beam depends on all surfaces. Thus dirt asymmetrically reducing the reflectivity of one surface has a minimum unbalancing effect.

This self-balancing of the adjacent analytic and reference beams is enhanced as the reflectivity of the surfaces are increased. In addition, in cases where the sample is an unevenly dispersed aerosol, for instance, both beams traverse the same total volume of the absorption chamber, greatly reducing error due to asymmetry in their location.

Although the invention has been described with reference to specified practical embodiments, it will be appreciated that various modifications may be made by those skilled in the art without departing from the spirit and scope of the invention.

What is claimed as new and desired to be secured by Letters Patent in the United States is:

I claim:

1. Radiation absorption analysis apparatus comprising:
   a. an absorption chamber into which a sample may be introduced having a partially transmissive, partially reflective plane mirror disposed at one end thereof and a partially transmissive, partially reflective concave mirror disposed at the opposite end thereof and arranged upon an axis common with the of said plane mirror to sustain multiple, internal reflections of a beam entrant parallel to said axis;
   b. means comprising a single radiation source for producing two adjacent beams parallel to said axis and directed toward said plane mirror, said beams being operated in succession and having dissimilar spectral content for differential adsorption by a sample; and c. radiation detection means coupled to the outer surface of said concave mirror for measuring the radiation passing through said absorption chamber corresponding to said successive beams.

2. Radiation absorption apparatus as set forth in claim 1 wherein said concave mirror is spaced a distance equal to its focal length from said plane mirror to provide confocal operation thereof.

3. Radiation absorption analysis apparatus set forth in claim 1 wherein said mirrors have a reflectance lying above 80 percent.

4. Radiation absorption analysis apparatus as set forth in claim 2 wherein said concave mirror and said plane mirror are of equal aperture.

5. Radiation absorption apparatus as set forth in claim 4 wherein said source is of a predetermined size; and wherein said means for producing two beams comprises a relay lens for imaging said source upon said concave mirror at a size substantially equal to the diameter thereof.

6. Radiation absorption apparatus as set forth in claim 5 wherein said relay lens is arranged at a distance from said plane mirror equal to the focal length of said concave mirror so that said relay lens is imaged on said concave mirror; and wherein said relay lens is of equal aperture to said mirrors.

7. Radiation absorption apparatus as set forth in claim 6 wherein said means for producing two beams further comprises means interposed between said relay lens and said absorption chamber for altering the spectral properties of one part of the radiation derived from said source with respect to another substantially equal part.

8. Radiation absorption apparatus as set forth in claim 7 wherein said two beams have adjoined semicircular cross sections together forming a circle.

PO-1050
(5/69)

UNITED STATES PATENT OFFICE
CERTIFICATE OF CORRECTION

Patent No. 3,588,496　　　　　　　　　　Dated　June 28, 1971

Inventor(s) Lawrence R. Snowman

It is certified that error appears in the above-identified patent and that said Letters Patent are hereby corrected as shown below:

| | | |
|---|---|---|
| Column 2, | line 53 | Change "(1 — 3 )" to -- (1 – 13)--; |
| | line 66 | Change "tee" to --the-- |
| Column 5, | line 8 | In the divisor, change " – " to -- + -- |
| Column 6, | line 7 | Change "form" to --from--; |
| | line 17 | Change "enter" to --center--; |
| | line 42 | After "analytic" insert --and--; |
| | line 68 | Change "the" to --that-- |

Signed and sealed this 8th day of February 1972.

(SEAL)
Attest:

EDWARD M.FLETCHER,JR.　　　　　　ROBERT GOTTSCHALK
Attesting Officer　　　　　　　　Commissioner of Patents